United States Patent
Molander et al.

(10) Patent No.: US 7,365,738 B2
(45) Date of Patent: Apr. 29, 2008

(54) GUIDES AND INDICATORS FOR EYE MOVEMENT MONITORING SYSTEMS

(75) Inventors: Mark E. Molander, Cary, NC (US); Nicole S. Zeisz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/727,237

(22) Filed: Dec. 2, 2003

(65) Prior Publication Data
US 2005/0116929 A1 Jun. 2, 2005

(51) Int. Cl.
*G06F 3/033* (2006.01)
*G09G 5/08* (2006.01)

(52) U.S. Cl. .................... 345/157; 715/859; 715/865
(58) Field of Classification Search ........ 345/157–158; 715/859, 865
See application file for complete search history.

(56) References Cited

U.S. PATENT DOCUMENTS

| | | | |
|---|---|---|---|
| 4,973,149 A | 11/1990 | Hutchinson | 351/210 |
| 5,214,414 A | 5/1993 | Levine et al. | 340/709 |
| 5,339,094 A * | 8/1994 | Murrell et al. | 345/157 |
| 5,802,533 A | 9/1998 | Walker | 707/529 |
| 5,831,594 A | 11/1998 | Tognazzini et al. | 345/156 |
| 6,106,119 A | 8/2000 | Edwards | 351/209 |
| 6,351,273 B1 * | 2/2002 | Lemelson et al. | 715/786 |
| 6,373,961 B1 | 4/2002 | Richardson et al. | 382/103 |
| 6,886,137 B2 * | 4/2005 | Peck et al. | 715/785 |
| 2002/0010707 A1 | 1/2002 | Chang et al. | 707/500 |
| 2002/0180799 A1 | 12/2002 | Peck et al. | 345/784 |
| 2003/0020755 A1 | 1/2003 | Lemelson et al. | 345/786 |

OTHER PUBLICATIONS

Yamato, M.; Kumashiro, T.; Monden, A; Matsumoto, K., Abstract Journal Paper—Title: Applying gaze-aided interface to drag-and-drop operation, Jan. 2003 from Transactions of the Information Processing Society of Japan, vol. 44, No. 1, pp. 166-175.

* cited by examiner

*Primary Examiner*—Amr A. Awad
*Assistant Examiner*—Michael Pervan
(74) *Attorney, Agent, or Firm*—Harrington & Smith, PC (57) ABSTRACT

A computer system aids user positioning of a pointing device by providing an animated post warp retro guide in conjunction with an eye tracking system, based on perceived user intent, to assist a user in maintaining continuity for pointer warps. An eye tracking apparatus monitors a user's eye orientation while the user views a video display, detects the eye orientation relative to the video display, and automatically moves the positioning device to the calculated eye orientation of the user, while providing an animated history of the first location of pointing device and a second location of the pointing device. To enable the user to maintain continuity while reading lines of text, a reading guide and visual indicator are also provided. Automated text scrolling and paging is provided to further accommodate a user to maintain continuity while reading large blocks of text.

24 Claims, 6 Drawing Sheets

420 ⇨ Companies in industries around the world are in a race that gets more difficult every year, with bigger, stronger, and more innovative competitors. In addition, the rules of the race are constantly changing with the emergence of electronic business, globalization, disruptive technologies, innovation and convergence of industries. Competitors who have been in other <u>races</u> suddenly join your race with strength, technology, and new approaches to the market -- often becoming instant leaders.

430

Nonetheless, it is possible to lead in this race for long periods of time and to create significant value for shareholders and employees. To do this, companies need a strategy that sustains their strong position in the race, anticipates changes, and helps them continue to lead.

The rules of the race are simple:

FIG.4A

IBM    [Search]

Executive strategy reports
Corporate strategy for the new millenium
By Peter J. S. Korsten and Paul J. Denman Companies in industries around the world are in a race that gets more difficult every year, with bigger, stronger, and more innovative competitors. In addition, the rules of the race are constantly changing with the emergence of electronic business, globalization, disruptive technologies, innovation and convergence of industries. Competitors who have been in other races suddenly join your race with strength, technology, and new approaches to the market ··often becoming instant leaders.
440

Nonetheless, it is possible to lead in this race for long periods of time and to create significant value for shareholders and employees. To do this, companies need a strategy that sustains their strong position in the race, anticipates changes, and helps them continue to lead.

FIG.4B

Companies in industries
420   every year, with bigger, s
rules of the race are con
business, globalization,
of industries. Competitors
with strength, technology
instant leaders.

FIG.5

GUIDES AND INDICATORS FOR EYE MOVEMENT MONITORING SYSTEMS

TECHNICAL FIELD

These teachings relate generally to the field of human-computer interaction technology and more particularly to guides and indicators for eye tracking systems.

BACKGROUND

Eye tracking technology determines the gaze point and length of gaze of a user. It can indicate to a computer where on, and for how long thereupon, a user is looking at a computer monitor, thus replacing the traditional PC mouse. Selections can be made by a slow blink or other switching mechanisms. Together with companion software, such as on-screen keyboards and voice recognition software, an eye tracker system becomes a completely hands-free method for computer use.

A number of eye tracking devices are available that track the eye movement and other elementary eye behaviors. Typical systems operate by mounting an eye tracking device adjacent to the computer monitor. The eye monitoring device is generally equipped with an infrared light-emitting diode, or LED. The LED bounces light off of the user's cornea and retina and the eye monitoring device records the reflections and sends the signals to software, which move the cursor to the spot where the user is looking. With these types of eye tracking systems, the cursor is positioned on a video screen according to the calculated gaze of the user. A number of different techniques have been developed to select a target in these systems.

For example, Chang et al. disclose in U.S. patent application Ser. No. 2002/0010707 A1, a system in which a user focuses on an annotation tag which can be determined by tracking the position of a conventional screen displayed pointer maneuverable by mouse, stylus, or keyboard, by use of touch sensitive overlays to a screen, eye or head tracking system, or any other conventional mechanism for reliably determining a user focus on a region of a screen display. Initiating dynamic display of supporting information at the user focus can be in response to user initiated mouse clicks, keyboard input, finger taps, duration (e.g. mouse cursor held still on or adjacent to an annotation tag for one tenth of a second to about two seconds, with one second being typical), or any other suitable input scheme for confirming a user desire to view supporting bodies of data. Accommodation of the supporting body of data can be through overlay or spatial morphing of the primary body of data. An overlay presentation replaces the annotation tag with supporting data, while concurrently identifying the annotated region of the primary body by suitable callouts, lines, markers, or animations that place the annotation in the margin, interline, or inter paragraph region, but still direct a user's attention to the related region of the primary body.

Tognazzini et al. disclose in U.S. Pat. No. 5,831,594, a method and apparatus for eye track derived backtrack to assist a computer user to find a last gaze position prior to an interruption of eye contact. The system of Tognazzini et al. indicates lost context by scrolling a virtual page and highlighting the last entity of a virtual page that had the last fixation immediately prior to the interruption. The lost context is marked in a number of ways to assist the user in reacquiring the context.

Other conventional methods of assisting a user to recall screen context include mouse trails and trackpoint accessibility features. A mouse trail is a feature of a Graphical User Interface (GUI) which causes the mouse pointer to leave a trail of mouse arrows that fade away as a user moves the mouse across the screen. Mouse trails are for normal user controlled mouse movements, and are a history of indicators of the source of the mouse pointer. They typically appear on the screen for a few milliseconds. Mouse trails keep track of approximately eight recent pointer positions, only erasing the oldest. At any time, there may be up to, for example, eight sequential pointers on the screen, but if the mouse is still, they will all be in the same position, and so only one will be visible. When the mouse moves, it appears to leave a trail of pointers behind it, and this can increase the visibility of the pointer.

A TrackPoint™ (TrackPoint is a registered trademark of International Business Machines Corporation.) Accessibility feature is a pulsing animation around the mouse pointer that is activated by the Control (Cntrl) key in Windows® XP (Windows is a registered trademark of Microsoft Corporation). It lets users find the mouse pointer more easily by providing a visual cue via a brief animation to enable a user to quickly locate the pointer on the display screen. This option is helpful for people with visual impairments.

Other conventional solutions to maintain visual feedback for a user of an eye tracking system include recording the screen location of where a user is looking and then jumping or "warping" the mouse pointer ahead to that location. A "pointer warp" can be described as occurring when the mouse pointer "jumps" to another part of the screen. A pointer warp is not a smooth transition, instead it skips ahead. A problem with the use of the pointer warp is that it can be disconcerting as well as disconnected. The mouse pointer jumps to the user's focus of attention, but there is no continuity with where it was previously. Another problem that exists during use of the conventional pointer warp involves the reading of text as a user can lose track of the line that is being currently read or when switching to a new line. As lines get longer, the problem grows.

SUMMARY OF THE PREFERRED EMBODIMENTS

The foregoing and other problems are overcome, and other advantages are realized, in accordance with the presently preferred embodiments of these teachings.

In one embodiment, the invention provides animated post-warp guides, in conjunction with an eye tracking system, to assist a user in maintaining continuity for pointer warps by reinforcing that the pointer has moved, and where it has moved from. This invention presents a quickly moving line to provide continuity to the user and to indicate where the user has come from.

An alternate embodiment warps the mouse pointer and displays a concentric pulse to subtly indicate the location of the mouse pointer.

A further embodiment of the invention assists readers of text. To avoid the pointer getting in the user's way of reading online text, the eye tracking software recognizes the pattern created when the user begins to read and changes the pointer automatically to a "reading" guide that aids the user in the reading activity. The reading guide can assume a number of suitable shapes and sizes.

A further embodiment of this invention automatically scrolls or pages the user through large blocks of text.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
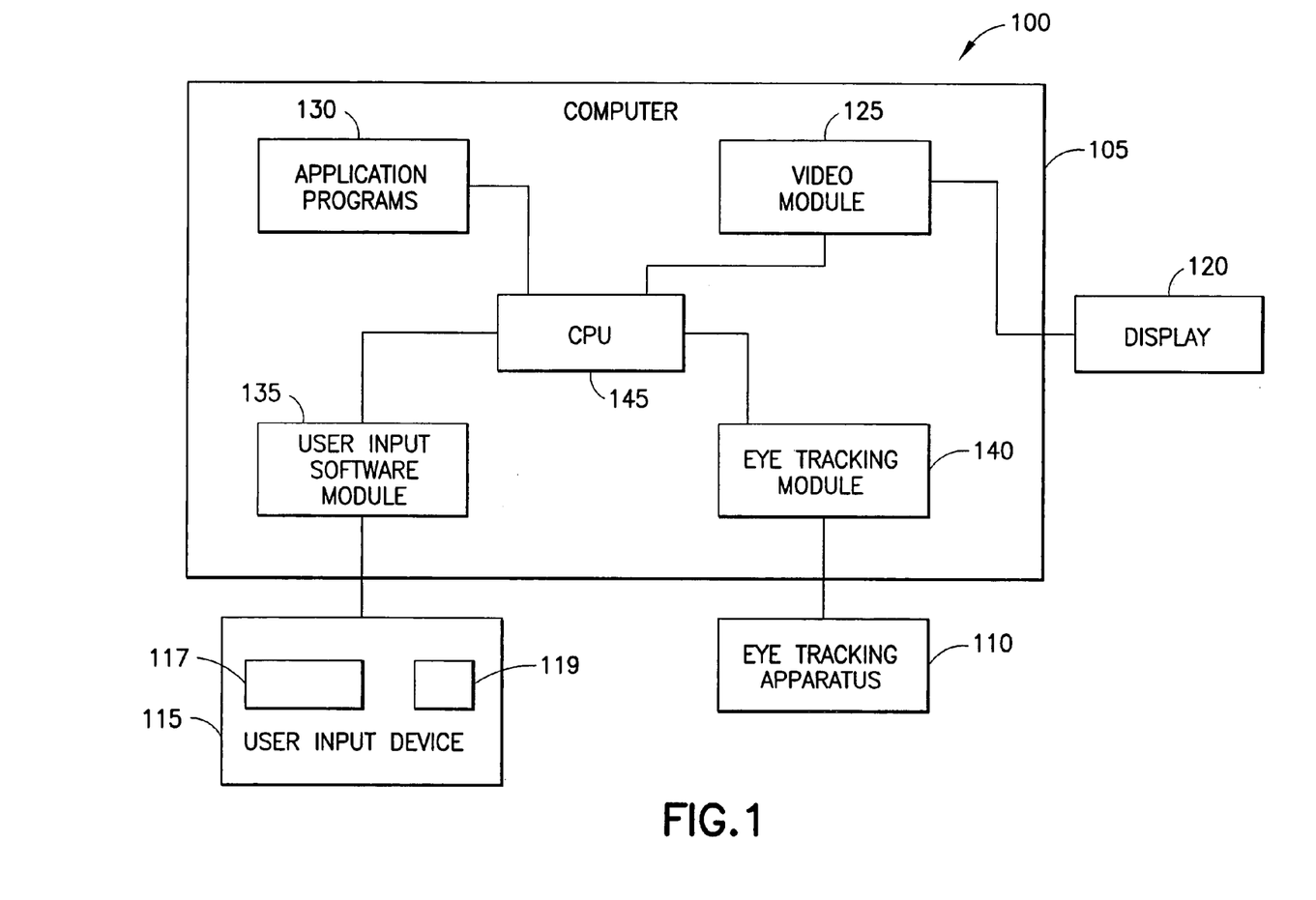
FIG. 1 is a simplified block diagram of a computer system in which the present invention may be implemented.

The invention may be implemented as a software program stored on a data storage device of a computer that operates in conjunction with an integrated eye tracking/pointer positioning system, which may be embodied by various hardware components and interconnections as illustrated by the system 100 of FIG. 1. Generally, the system 100 includes a computer 105, an eye tracking apparatus 110, a user input device 115, and a display 120. The user input device 115 typically comprises a keyboard 117 and mouse 119, and an appropriate set of software drivers, shown as the user input software module 135.

The display 120 provides a medium for visually presenting text and graphics to a user. The display 120 may be implemented by any suitable computer display with sufficient ability to depict graphical images including a cursor. For instance, the display 120 may employ a cathode ray tube, liquid crystal diode screen, light emitting diode screen, a projected image, a holographic image, or another suitable video apparatus. The images of the display 120 are determined by signals from a video module 125. The display 120 may also be referred to by other names, such as video display, visual display, video screen, display screen, video monitor, display monitor, etc. The displayed cursor, also referred to herein as a positioning device, visual pointer, mouse pointer, or pointing device may comprise an arrow, cross-hair, or any other image suitable for selecting targets or positioning an insertion point.

The computer 105 also includes one or more application programs 130, such as a web browser or a word processing program, an eye tracking module 140, which includes a software module configured to receive and interpret signals from the eye tracking apparatus 110, and a central processing unit (CPU) 145.

The system 100 is used by a "user", also referred to as an "operator". One skilled in the art will understand that many different types of eye tracking devices 110 can be used with the invention. For example, commercial eye gaze tracking systems are made by ISCAN Incorporated (Burlington Mass.), LC Technologies (Fairfax Va.), and Applied Science Laboratories (Bedford Mass.).

The eye tracking apparatus 110 is a device for monitoring the eye gaze or eye orientation of the computer user. The eye tracking apparatus 110 may use many different techniques to monitor and detect the eye orientation of the user, including, but not limited to corneal reflection and pupil tracking. One skilled in the art will recognize a number of different devices suitable for use as the eye tracking apparatus 110.

The present invention introduces a method for eye tracking and automatic pointer warping. The invention automatically changes the mouse pointer based on perceived user intent. The invention monitors the user's eye movements, also referred to herein as the user's eye orientation or gaze position, and if it appears that intent is there (i.e. the user fixates for a predetermined number of milliseconds on an area of the screen) the invention immediately jumps the mouse pointer automatically to that spot of the visual display according to the calculated gaze of the user. As an example, calculating the gaze of the user may be performed by receiving x-y coordinate signals from the eye tracking module 140. Generally, conventional mouse trails do not provide useful information to a user who is in direct control of the mouse pointer as the user is already aware of the initial position of the mouse pointer as well as the intended new location of the mouse pointer. Because the user of the present invention is less in direct control of the mouse pointer, mouse history indication, as well as current location emphasis is useful to the user for maintaining context during automatic pointer warping.

Figure 2A:
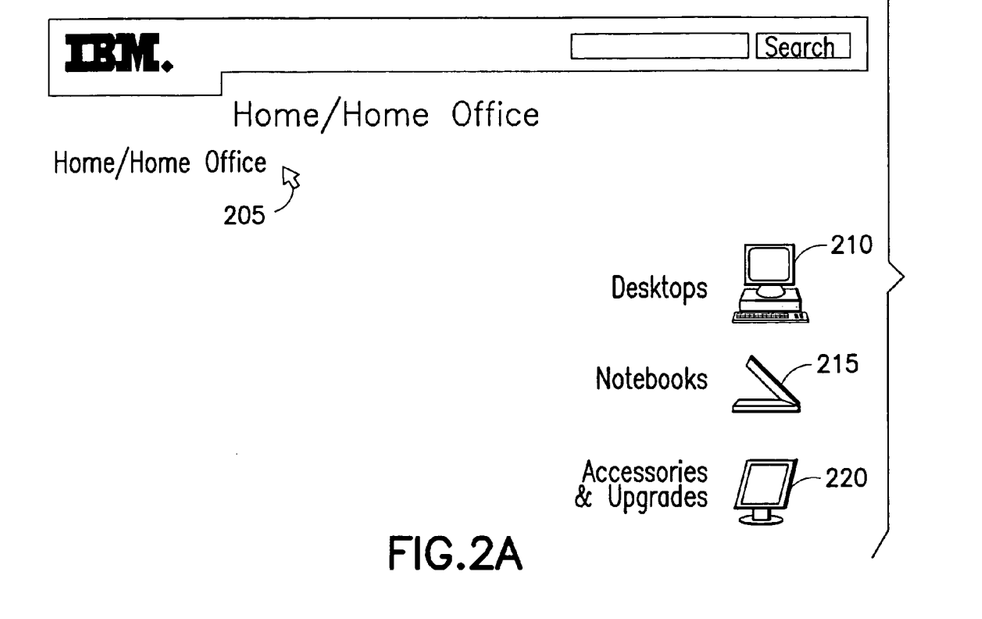
FIG. 2A-2D is an illustration of an animated post pointer warp retro guide.
Figure 2B:
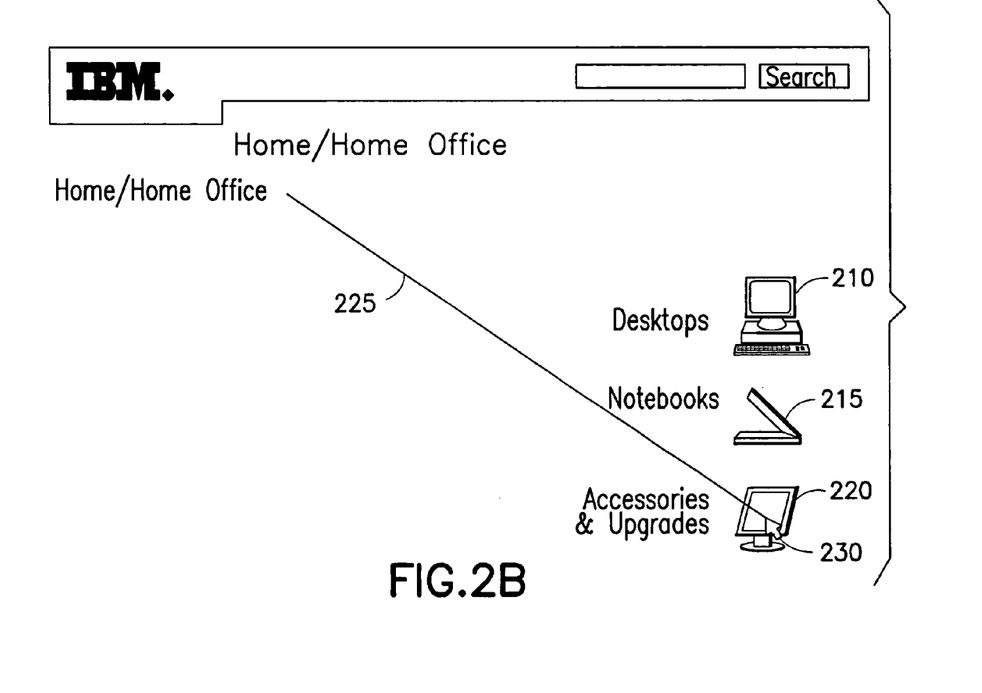

To help give the user continuity for pointer warps, reinforce that the mouse pointer has moved, and where it has moved from, animated post-warp retro guides are provided as a visual indicator to the user. Referring to FIG. 2A, a basic illustration is depicted where a user is looking at a navigation link on a web site 205. The user in this example wishes to purchase a new monitor for his home computer. The user finds and looks at the monitor graphic 220 in the lower right of the computer display screen. The eye tracking apparatus 110 and software 140 sense that the user is looking at that monitor graphic 220 and that he is interested in it (e.g., the eyes stop moving and fixate at the monitor graphic for a predetermined number of milliseconds). Therefore, the mouse pointer automatically warps to that spot representing the monitor graphic 220 of the display screen. Coinciding with this warp, the animated post warp retro guide 225 is displayed as illustrated in FIG. 2B, providing a visual indicator to indicate the initial position of the mouse pointer 205 thus providing the user with continuity and a smooth transition.

Figure 2C:
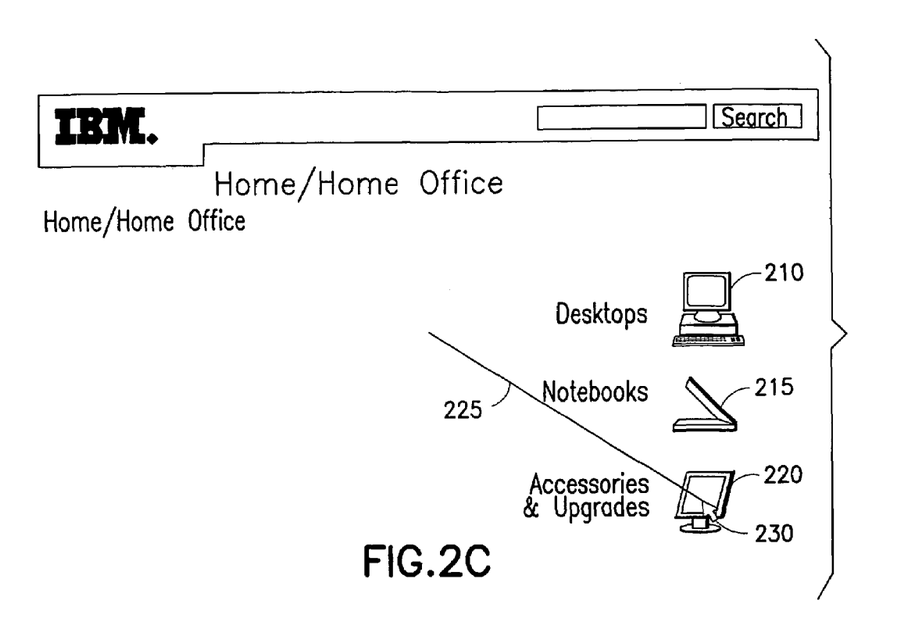
Figure 2D:
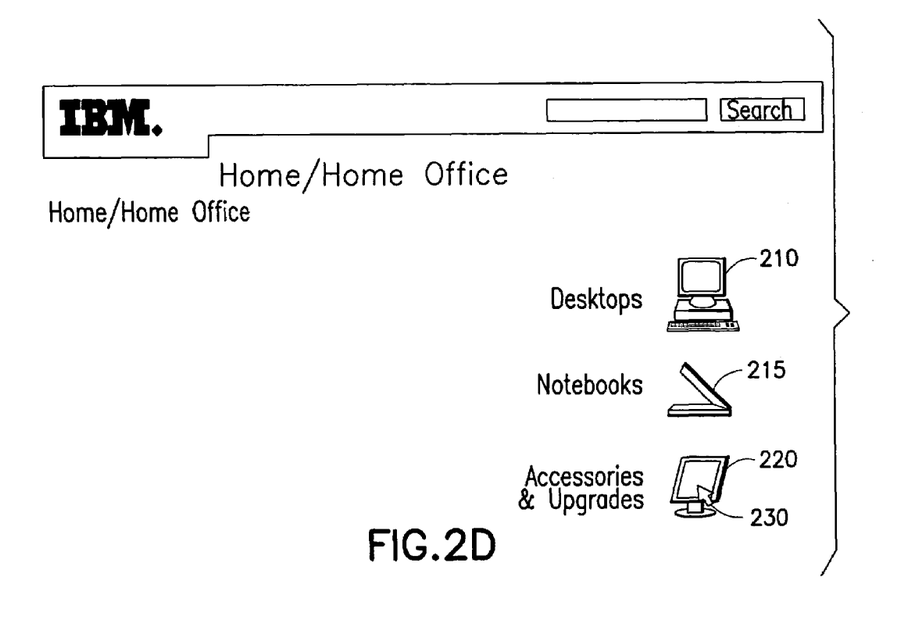

The invention further helps indicate where the pointer currently is 230, referring to FIG. 2C and FIG. 2D. The movement of the animated post warp retro guide 225 enables the user to quickly locate the new warped pointer location 230. The movement of the animated post warp retro guide 225 also quickly enables the user to determine the initial location of the mouse pointer 205 which is a valuable feature as the movement of the mouse pointer 205 is automated by the invention as contrasted to the conventional method of a mouse pointer being manually controlled by the user. It can also be appreciated that the visual indicator provides a spatial relationship between the initial position of the mouse pointer 205 and the new warped pointer location 230.

Figure 3A:
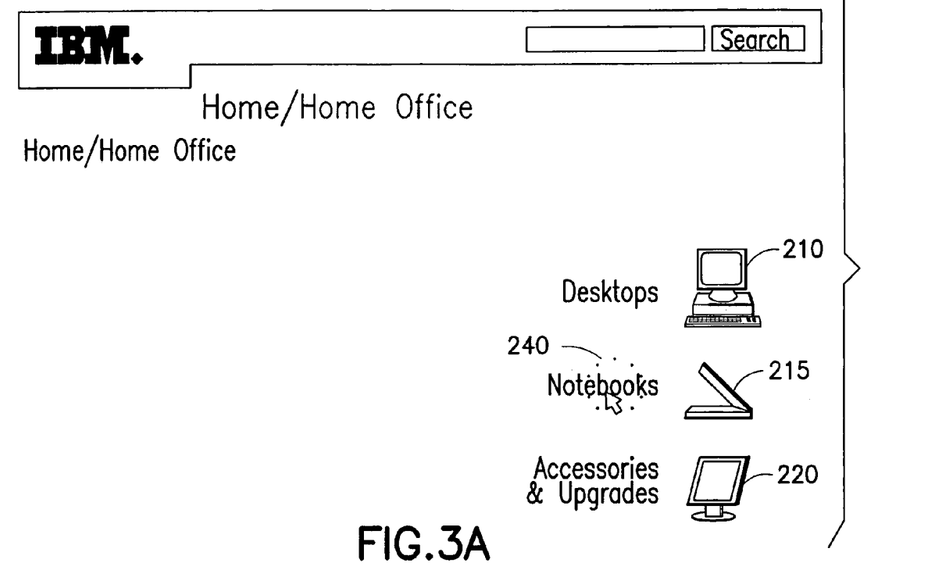
FIG. 3A-3B is an illustration of a concentric pulse indicator.
Figure 3B:
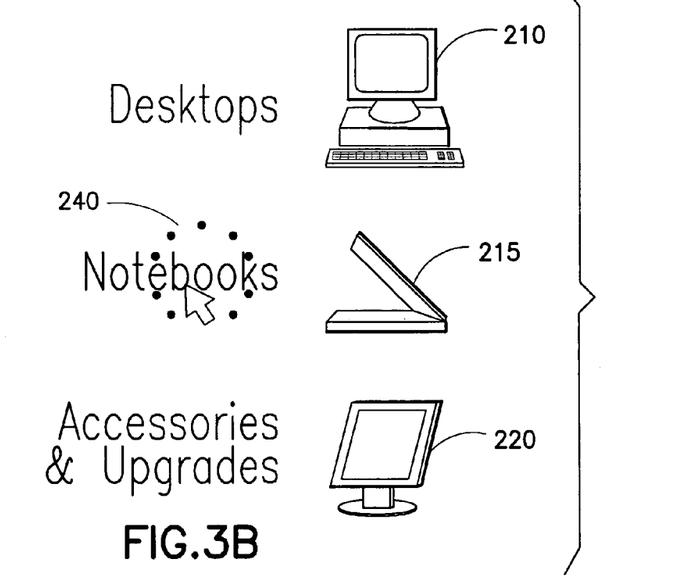

Referring to FIGS. 3A and 3B, an alternate embodiment of the present invention warps the mouse pointer and shows a concentric pulse 240 to subtly indicate that warping has occurred. The invention provides an enhanced environment for tracking mouse pointer movements using concentric pulses 240. In addition, the concentric pulse 240 may be used in conjunction with the retro guide 225 if, for example, the user wishes to further accentuate the obviousness of the movement of the mouse pointer. Conventionally, the mouse trail arrow pointer appears as multiple instances along the movement line. The invention emphasizes non-pointer ways to achieve the same result making it aesthetically pleasing to the user, and more indicative of past movement (retro guides) and current location (pulse), as opposed to multiple mouse pointers along a line. The concentric pulse 240 is especially useful for other users following the pointer movement of another user (e.g., demos, class rooms, etc.).

Conventionally, a pulsating animation around the mouse pointer can be manually activated by the user, for example, as in Windows® XP, by pressing the Control (Ctrl) key to assist a user in locating the mouse pointer. This pulsating animation is beneficial for when the user loses the mouse pointer in a corner, or otherwise can not locate the mouse pointer. The present invention combines this pulsing animation with mouse pointer warping. So, while a conventional user must manually click the Ctrl key, the present invention automatically and seamlessly provides the location of the mouse pointer to the user as part of the overall warping method. The pointer history, according to the present invention, is for warping automated mouse pointer movements, and also for emphasizing current pointer location via pulsing.

A further embodiment of the invention illustrates how the invention assists readers of text. When in a reading mode, which is automatically sensed by, for example, the user's left-to-right linear eye movement tied to the eye tracking software 140, the current line of text being read is indicated with an open bracket in the margin to the left of the line 420, referring to FIG. 4A. Of course, the present invention can be adapted to sense other reading modes such as, for example, a right to left linear eye movement. When the user slows down or stops on a link 430, the "read mode" stops and the mouse pointer reappears 440 so the user can click on the link, illustrated in FIG. 4B.

Figure 4A:
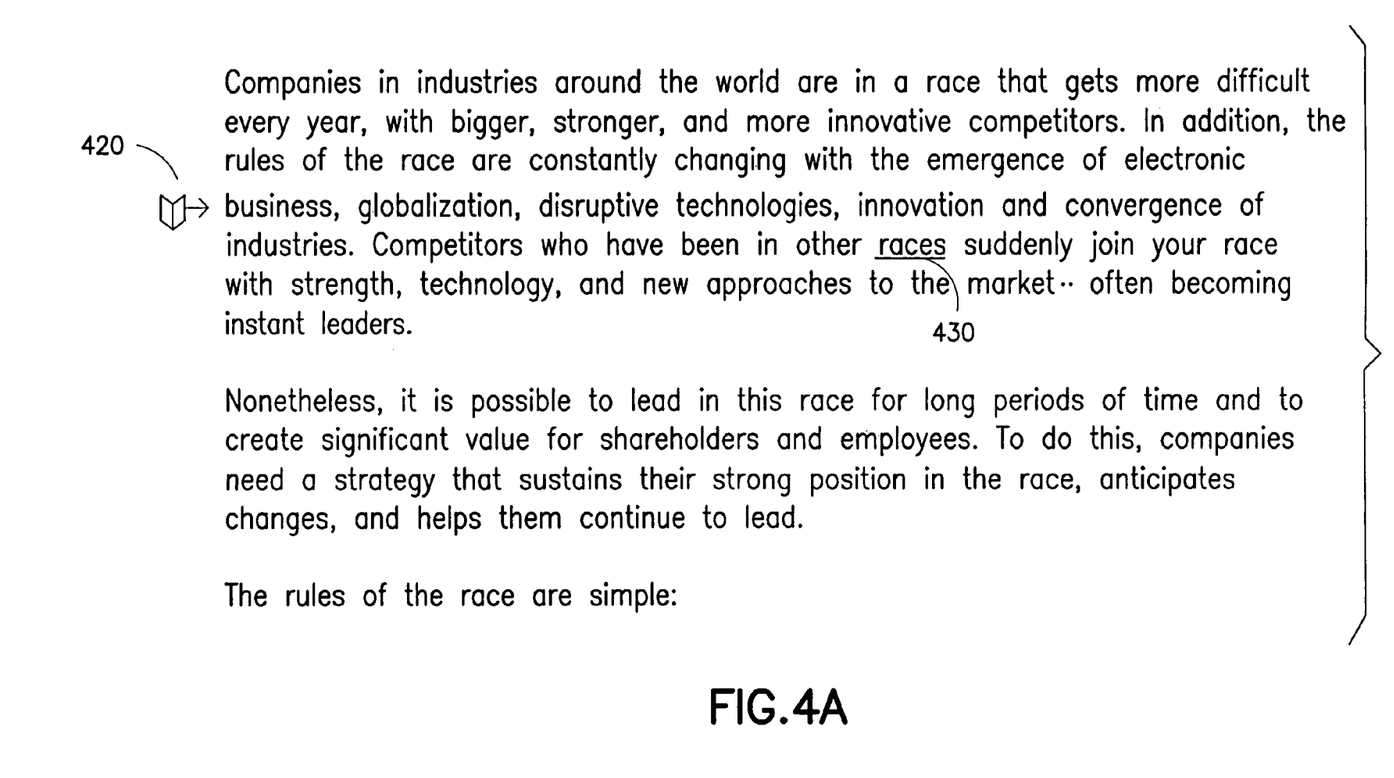
FIG. 4A illustrates a reading guide according to the present invention.
Figure 4B:
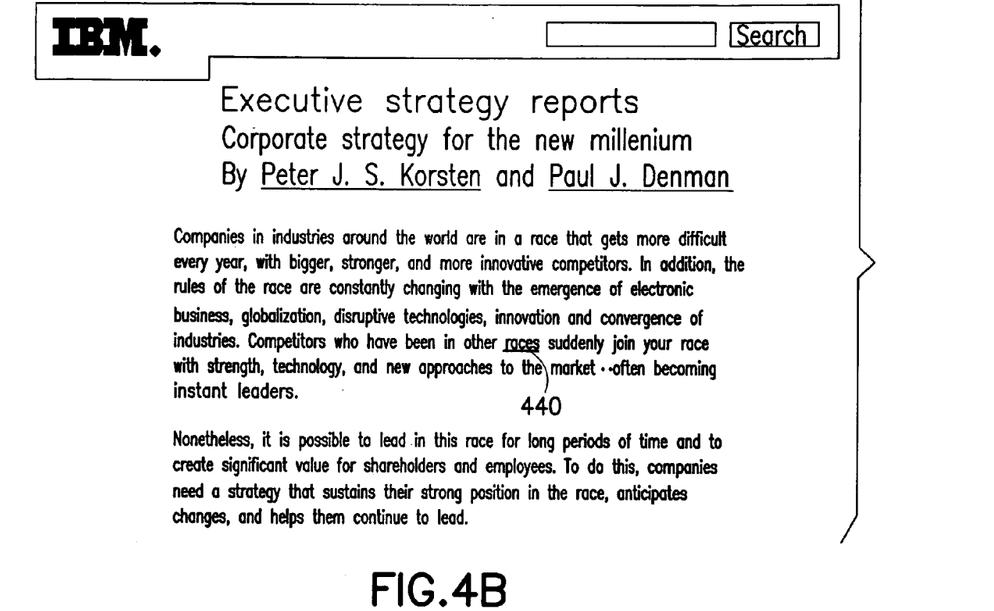
FIG. 4B illustrates the reading guide reverting to a pointer.
Figure 5:
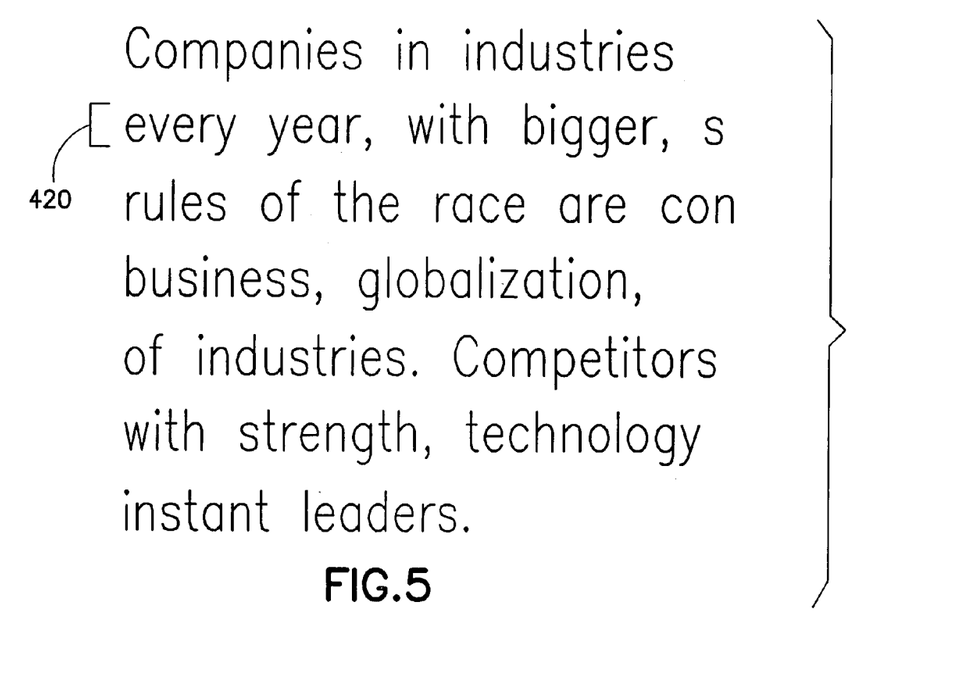
FIG. 5 illustrates an alternate reading guide according to the present invention.

To avoid the pointer from getting in the user's way of reading online text, the eye tracking software 140 recognizes the pattern created when the user begins to read and changes the pointer to a "reading" guide 420 that aids the user in the reading activity. This guide 420 maintains a position in the margin of the text, serving three purposes. First, the reading guide assists the reader in maintaining a fluid reading pattern without losing the proper line location by marking the beginning of the current line, and by automatically repositioning the reading guide at the beginning of the next line of text as the user approaches the end of the current line of text. Second, by following the user's reading pattern, the guide 420 knows when to scroll the page when the user reaches the "fold". Third, the guide 420 remains in the margin, ready to respond to the user's request for the mouse pointer, which is typically initiated by a pause, or stare, which converts the guide 420 back to a mouse pointer state 440 when needed. Referring to FIG. 5, the reading guide 420 can assume a number of suitable shapes and sizes.

A further embodiment of the invention automatically scrolls or pages the user through large blocks of text. By following the user's reading pattern, the guide 420 knows when to scroll the page. As the user, while in a reading mode, approaches completion of the viewable area of text (i.e., reaches the end of the text), the eye tracking software responds by either gradually scrolling the text area ahead automatically for the user or by abruptly paging ahead automatically for the user. An alternate embodiment of the invention for automatically scrolling the user though large blocks of text maintains the user's current line of text centered, or slightly off center vertically so the user has more of a working margin above and below the current line, and can more easily read ahead or back in the text.

While described in the context of eye track apparatus, any suitable technique for detecting and/or monitoring user's eye motion and/or eye orientation (e.g. gaze direction) may be used including direct or indirect monitoring of visual signals.

Further, although described in terms of preferred embodiments, it should be realized that a number of modifications of the teachings of this invention may occur to one skilled in the art and will still fall within the scope of this invention. By example, the present invention specifically makes reference to hardware relating to the automatic scroll control system that includes a computer system, display, screen, or monitor, other computer peripherals, and an eye tracking system. However, numerous other types of computer systems, displays, screens, monitors, and eye tracking systems, are well known to exist, and most likely, numerous other computer and tracking related systems, devices, and components will be developed in the future. The invention described herein is not to be limited in use with specifically referenced types of computer and tracking related systems, devices, components, and peripherals, but rather, are intended to be used with any and all types of computer and tracking related systems, devices, components, and peripherals.

Further, while the teachings of this invention described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof.

What is claimed is:

1. A computer readable medium having computer readable program code embodied therein for causing a computer to control the position of a visual pointer using an eye tracking apparatus by:
    moving a visual pointer from a first location to a second location that corresponds to a user's eye orientation based on input received from the eye tracking apparatus;
    providing a visual indicator between the first location and the second location;
    automatically changing the visual indicator to a reading guide in response to the eye tracking apparatus recognizing a user's eye movement pattern as a read mode, where the reading guide is located in a margin at the beginning of a line of text that is read;
    repositioning the reading guide in response to the eye tracking apparatus determining that the user approaches the end of a line of text; and
    in response to the eye tracking apparatus determining that the user's eye movements are one of slowing down or stopping on a link in the text, exiting the read mode and changing the visual indicator to a pointer for a pointing device to enable the user to click on the link.

2. A computer readable medium as in claim 1, wherein the visual indicator comprises a substantially linear display element.

3. A computer readable medium as in claim 1, wherein the visual indicator comprises a substantially circular display element.

4. A computer readable medium as in claim 1, wherein the visual indicator provides visual continuity between the first location and the second location of the visual pointer.

5. A computer readable medium as in claim 1, wherein the visual indicator indicates the first location of the visual pointer and the second location of the visual pointer.

6. A computer readable medium as in claim 1, wherein the visual indicator provides a spatial relationship between the first location of the visual pointer and the second location of the visual pointer.

7. A computer readable medium as in claim 1, wherein the visual indicator comprises a graphic animation of a spatial relationship between the first location and the second location of the visual pointer.

8. A computer readable medium as in claim 1, wherein moving the visual pointer to the second location is based on inferring user intent from the user's detected eye orientation.

9. A computer readable medium as in claim 1, wherein the reading guide comprises an open bracket.

10. A computer readable medium as in claim 1, wherein the reading guide is positioned to the left of a line being read.

11. A computer readable medium as in claim 1, wherein the reading guide scrolls lines of displayed text in response to the user's eye orientation based on input received from the eye tracking apparatus.

12. A computer readable medium as in claim 1, wherein the reading guide is changed to a visual pointer based on sensing an eye movement of the user.

13. A computer system comprising:
a processor;
a visual display output coupled to said processor;
said processor comprising an input for receiving a signal from an eye tracking apparatus, the eye tracking apparatus for monitoring a user's eye movements, and said processor is configured to provide a signal at said visual display output for moving a visual pointer from a first location to a second location corresponding to the user's eye orientation, to generate a visual indicator between the first location and the second location, to automatically change the visual indicator to a reading guide in response to the eye tracking apparatus recognizing a user's eye movement pattern as a read mode, where the reading guide is located in a margin at the beginning of a line of text that is read, to reposition the reading guide in response to the eye tracking apparatus determining that the user approaches the end of a line of text, and in response to the eye tracking apparatus determining that the user's eye movements are one of slowing down or stopping on a link in the text, to exit the read mode and change the visual indicator to a pointer for a pointing device to enable the user to click on the link.

14. A computer system as in claim 13, wherein the visual indicator comprises a substantially linear display element.

15. A computer system as in claim 13, wherein the visual indicator comprises a reading guide for assisting the user in reading displayed text.

16. A computer implemented method for eye track assisted pointer positioning comprising:
operating an eye tracking apparatus to monitor a user's eye movements as the user views a visual display;
detecting the user's eye orientation, relative to the visual display;
moving a visual pointer from a first location to a second location of the visual display that corresponds to the user's eye orientation;
providing a visual indicator in the visual display between the first location and the second location;
automatically changing the visual indicator to a reading guide in response to the eye tracking apparatus recognizing a user's eye movement pattern as read mode, where the reading guide is located in a margin at the beginning of a line of text that is read;
repositioning the reading guide in response to the eye tracking apparatus determining the user approaches the end of a line of text; and
in response to the eye tracking apparatus determining that the user's eye movements are one of slowing down or stopping on a link in the text exiting the read mode and changing the visual indicator to a pointer for a pointing device to enable the user to click on the link.

17. A computer implemented method as in claim 16, wherein the visual indicator provides visual continuity between the first location and the second location of the visual pointer.

18. A computer implemented method as in claim 16, wherein moving the visual pointer to the second location is based on inferring user intent from the user's detected eye orientation.

19. A computer implemented method as in claim 16, where the visual indicator is one of a linear retro guide and a pulse and is not comprised of multiple mouse pointers.

20. A computer implemented method as in claim 16, wherein the visual indicator comprises a substantially linear display element.

21. A computer implemented method for eye track assisted pointer positioning comprising:
operating an eye tracking apparatus to monitor a user's eye movements as the user views a visual display;
detecting the user's eye orientation, relative to the visual display;
automatically changing the visual indicator to a reading guide in response to the eye tracking apparatus recognizing a user's eye movement pattern as a read mode, where the reading guide is located in a margin at the beginning of a line of text that is read;
moving the reading guide from a first location to a second location of the visual display that corresponds to the user's eye orientation in response to the eye tracking apparatus determining that the user approaches the end of a line of text; and
in response to the eye tracking apparatus determining that the user's eye movements are one of slowing down or stopping on a link in the text, exiting the read mode and changing the visual indicator to a pointer for a pointing device to enable the user to click on the link.

22. A computer implemented method as in claim 21, wherein the reading guide comprises an open bracket.

23. A computer implemented method as in claim 21, wherein the reading guide scrolls lines of displayed text in response to the user's eye orientation based on input received from the eye tracking apparatus.

24. A computer implemented method as in claim 21, wherein the reading guide is changed to a visual pointer based on sensing an eye movement of the user.

* * * * *